United States Patent van Staveren

[15] 3,668,867

[45] June 13, 1972

[54] COMPRESSOR GAS TURBINE INSTALLATION

[72] Inventor: Pieter van Staveren, Pijnacker, Netherlands

[73] Assignee: Nederlandse Organisatie Voor Toegepast-Natuurweten-Schappelijk Onderzoek Ten Behoeve Van Nijverheid, Handel en Verkeer, The Hauge, Netherlands

[22] Filed: Feb. 26, 1970

[21] Appl. No.: 14,590

[30] Foreign Application Priority Data

Feb. 26, 1969 Netherlands..........................6903027

[52] U.S. Cl..............................60/39.28, 417/67, 417/171
[51] Int. Cl. ........................................................F02c 9/08
[58] Field of Search ...............60/39.28; 417/67, 171; 261/29

[56] References Cited

UNITED STATES PATENTS

| | | |
|---|---|---|
| 1,266,726 | 5/1918 | Suczek....................................417/67 |
| 1,994,450 | 3/1935 | Carpenter................................417/67 |
| 3,046,732 | 7/1962 | Foa....................................417/171 X |

*Primary Examiner*—Clarence R. Gordon
*Attorney*—Watson, Cole, Grindle & Watson

[57] ABSTRACT

A compressor gas turbine installation provided with a heat-exchanger for transferring heat from the exhaust gases of the gas turbine on to the compressed energy-medium and a combustion chamber with an automatic control of the fuel supply for keeping the turbine-outlet temperature constant.

As a compressor at least one centrifugal fluid vanes compressor with a secondary rotor is applied, the primary rotor of it being coupled with the turbine.

In the liquid duct to the compressor an adjusting device is incorporated for controlling the liquid supply, with which device the power delivered by the compressor gas turbine installation can be controlled.

2 Claims, 2 Drawing Figures

COMPRESSOR GAS TURBINE INSTALLATION

The invention relates to a compressor gas turbine installation, provided with a heat-exchanger for transferring heat from the exhaust gases of the gas turbine on to the compressed energy-medium and a combustion chamber with an automatic control of the fuel supply for keeping the turbine-outlet temperature constant.

It is known in the art that a compressor gas turbine installation provided with a heat-exchanger yields an output that is economically acceptable, but that it is remarkably inert when the power delivered is varied.

It is also known in the art that in varying the power delivered by a compressor gas turbine installation coupled with an electric generator this inertia to variation can be reduced by feeding back into the gas turbine cycle in the form of heat, that part of the power that is not taken off, the control of the fuel supply to the combustion chamber automatically keeping the turbine-outlet temperature constant.

It is an object of this invention to improve a compressor gas turbine installation which is not coupled with an electric generator.

It is another object of this invention to reduce the inertia to varying the power emitted by such a compressor gas turbine installation.

For this purpose in the compressor gas turbine installation according to the invention a centrifugal fluid vanes compressor for compressing a gaseous medium is applied, such as described in the commonly owned co-pending U.S. patent application Ser. No. 13932, filed Feb. 25, 1970.

In this centrifugal fluid vanes compressor, in an efficient way a separation of liquid and gaseous media is obtained and the excess energy still present in the liquid is recovered.

For this purpose one or both of the parallel walls bounding the space for the fluid vanes has been provided with a ring of blades and is mounted in such a way that it can rotate freely and concentrically with respect to the driven rotor. Hereinafter this wall will further be indicated as a secondary rotor.

The gaseous medium is laterally discharged before the ring of blades, of which the fronts of the blades are interconnected by a wire mesh screen and the liquid is flung through the wire mesh screen and sets the secondary rotor in rotation.

For the supply of the liquid to the compressor a small pump is required, which can be driven by the turbine.

The centrifugal fluid vanes compressor has been designed in such a way that the useful power delivered by the gas turbine becomes available at the shaft of the secondary rotor, consequently, and apart from some losses, the power still present in the liquid at the end of the compression process is equal to the power to be delivered by the gas turbine.

It is part of this invention that the control of the power delivered by the compressor gas turbine installation can be effected by adjusting the liquid supply to the fluid vanes compressor.

Other objects and advantages of the present invention will hereinafter appear from the following specification and accompanying drawings wherein.

Figure 1:
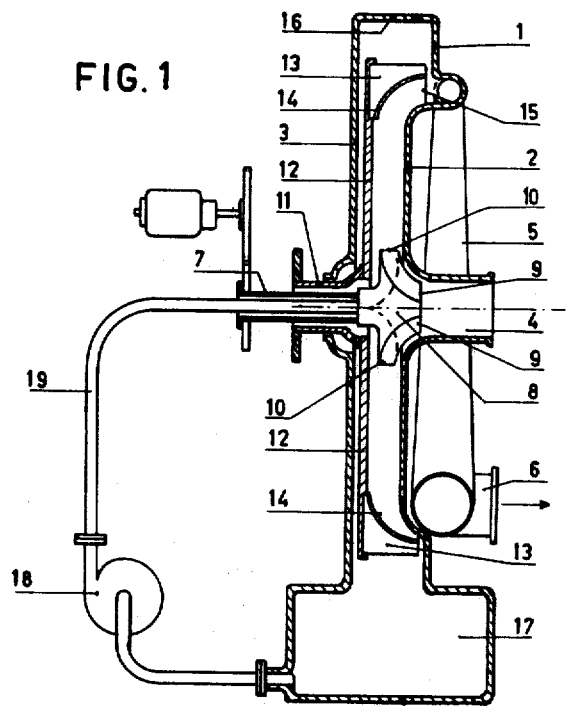
FIG. 1 is a cross sectional view of a centrifugal fluid vanes compressor that is schematically shown.

In FIG. 1 an embodiment is shown of a centrifugal fluid vanes compressor in accordance with the above referred to application.

This comprises a housing 1 with two parallel walls 2 and 3, an intake 4 for the gaseous medium, a collecting space 5 with an outlet 6 for the compressed gaseous medium and a rotor 8 mounted fixedly on a driven shaft 7, and provided with blades 9 for suctioning the gaseous medium to be compressed and jet channels 10 for forming fluid vanes. A secondary rotor 12 mounted fixedly on a shaft 11 is mounted to rotate freely around shaft 7 of rotor 8 and has been provided with a ring of blades 13 alongside its periphery. Over their entire fronts the blades have been interconnected by a circumferential wire mesh screen 14. This wire mesh screen bounds lateral discharge 15 of the gaseous medium. The liquid, after having passed the ring of blades 13, is flung against inner side 16 of the compressor housing and discharged to a casing 17, from where, with the aid of a pump 18, it is carried to rotor 8 via a fluid duct 19. The liquid vanes are formed between wall 2 and secondary rotor 12. The medium carried forward with and compressed by the fluid vanes is conducted along through lateral discharge 15, while the fluid enters into the ring of blades 13 through wire mesh screen 14, where, apart from some minor losses, the excess power still present in the liquid is absorbed and thereby sets secondary rotor 12 in rotation. This recovered power can be taken off from shaft 11.

Figure 2:
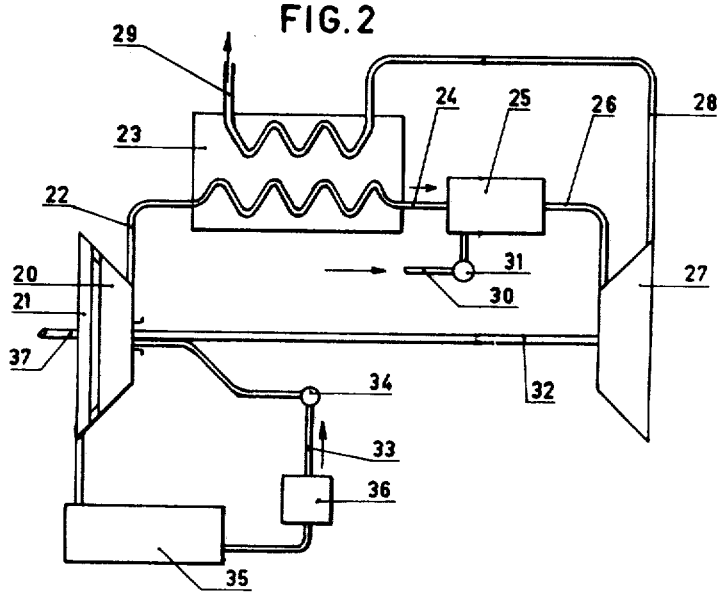
FIG. 2 is a compressor gas turbine installation that is schematically shown.

In the compressor gas turbine installation, shown schematically in FIG. 2, such a centrifugal fluid vanes compressor with secondary rotor is applied, the centrifugal fluid vanes compressor being generally indicated by 20 and the secondary rotor shown at 21. From this compressor a discharge duct 22 for the compressed gaseous medium (for example air) has been connected to a heat-exchanger 23, the outlet of which via a duct 24 has been connected to a combustion chamber 25, which via a duct 26 has been connected to the intake of a turbine 27. The outlet of this turbine has been connected via a duct 28 to heat-exchanger 23, from where the exhaust gases are further discharged via a discharge 29.

In a fuel supply duct 30 an adjustment device 31 for the fuel supply to combustion chamber 25 has been incorporated.

The primary rotor of centrifugal fluid vanes compressor 20 is mounted fixedly on a shaft 32 of turbine 27.

The liquid (for example water) is carried from a liquid reservoir 35 with the aid of a pump 36 via a fluid supply duct 33, in which an adjustment device 34 is incorporated, to centrifugal fluid vanes compressor 20.

The liquid passes the blades of secondary rotor 21, while transmitting its power to the secondary rotor, and is then recycled to liquid reservoir 35.

Secondary rotor 21 is mounted fixedly on a shaft 37, from which power can be taken off.

By adjusting device 34 the power delivered by the gas turbine installation is controlled.

Under all conditions the exhaust temperatures of a turbine are kept constant in a way known in the art by an automatic control of the fuel supply to the combustion chamber.

If, via the adjustment device liquid the fuel supply to the primary rotor of the compressor diminishes, then this results in a lower compression ratio of the compressor, which, together with the fuel supply control described above, moreover results in a smaller quantity of the gaseous medium flowing through the gas turbine. In the process, the losses which are accompanied by throttling that occurs in the adjustment device are negligibly small with respect to the remaining powers.

As a result of this control, also, less liquid flows through the secondary rotor of the compressor, so that in the latter less power is delivered.

If no power must be delivered when the installation is in operation the supply of fluid to the compressor is entirely shut off. Then the gas turbine operates at the small pressure ratio that the primary rotor still yields by the blades mounted on it which are required for the shock-free entry of the gaseous medium into the rotor.

Further it is possible to design the centrifugal fluid vanes compressor and the turbine in such a way that, with every quantity of power taken off, from no-load to full load, so at every adjustment of the liquid supply to the compressor, the speeds of the primary rotor and turbine remain constant. Accordingly, the inertia to variation in rotation speed that arises from the acceleration and deceleration of the installation disappears.

By keeping the temperature constant the life time of the installation and in particular that of the turbine are extended considerably. It is now, however, also possible to raise the temperature. Admittedly by this the advantage of the longer life time is partly lost, but the total efficiency of the installation increases considerably.

Finally it is self-evident that the invention can be applied in compressor gas turbine installations with an open cycle, a closed cycle or an open cycle with peak power.

From the foregoing it will be readily apparent to those skilled in the art that the present invention provides novel and useful improvements to compressor gas turbine installations. It will also be understood that only a specific embodiment of the invention has been described and that modifications may be made thereto without departing from the spirit of the invention, the scope of which is set forth in the appended claims.

What is claimed is:

1. An improved gas turbine installation comprising a compressor unit, a heat exchanger for transferring heat from the exhaust gases of the gas turbine to a compressed energy-medium, a combustion chamber with an automatic control of the fuel supply for keeping the turbine outlet-temperature constant, and a gas turbine; the improvement consisting in that the compressor unit comprises a centrifugal fluid vane-type compressor with a housing having a pair of spaced parallel walls with an intake for a gaseous medium and an outlet for the gaseous medium compressed thereby, a driven primary rotor provided in the center of the housing with blades for suctioning the gaseous medium and provided with jet channels connected with a liquid reservoir through a liquid duct provided with means for supplying liquid to the jet channels for forming liquid vanes effecting a compressive action upon the gaseous medium between said parallel walls; the primary rotor being coupled with the turbine, at least one of said parallel walls being provided with a ring of blades surrounding the primary rotor and mounted near the periphery of said wall, said wall rotating like a secondary rotor freely and concentrically with said primary rotor; the entire fronts of the blades of said secondary rotor being interconnected by a wire mesh screen bounding the discharge of said gaseous medium; means to return the liquid in the liquid reservoir; and an adjustment device in said liquid duct to the primary rotor for controlling the flow of liquid to said jet channels.

2. In a gas turbine installation, according to claim 1, wherein the compressor unit comprises at least one centrifugal fluid vane-type compressor with primary rotor and secondary rotor, said fluid vane-type compressor being connected in series on a single turbine shaft with at least one traditional compressor.

* * * * *